(12) United States Patent
Christopher et al.

(10) Patent No.: US 7,600,567 B2
(45) Date of Patent: Oct. 13, 2009

(54) DESALINATION METHOD

(75) Inventors: Charles Arles Christopher, Houston, TX (US); Ian Ralph Collins, Middlesex (GB); Harry Frampton, West Yorkshire (GB); Folkert Paul Visser, Ulsan (KR)

(73) Assignees: BP Exploration Operating Company Limited, Middlesex (GB); BP Corporation North America Inc., Warrenville, IL (US)

(*) Notice: Subject to any disclaimer, the term of this patent is extended or adjusted under 35 U.S.C. 154(b) by 0 days.

(21) Appl. No.: 11/596,974

(22) PCT Filed: May 19, 2005

(86) PCT No.: PCT/GB2005/001939

§ 371 (c)(1),
(2), (4) Date: Oct. 19, 2007

(87) PCT Pub. No.: WO2005/119007

PCT Pub. Date: Dec. 15, 2005

(65) Prior Publication Data

US 2008/0169098 A1 Jul. 17, 2008

Related U.S. Application Data

(60) Provisional application No. 60/575,100, filed on May 28, 2004.

(51) Int. Cl.
*E21B 43/20* (2006.01)
*E21B 43/38* (2006.01)
(52) U.S. Cl. .............. 166/275; 166/263; 166/266; 166/279; 166/310
(58) Field of Classification Search .................. None
See application file for complete search history.

(56) References Cited

U.S. PATENT DOCUMENTS 3,283,813 A 11/1966 Brownscome et al.

(Continued)

FOREIGN PATENT DOCUMENTS

EP 0 968 755 A2 1/2000

(Continued)

OTHER PUBLICATIONS

Webb, K.J., et al; "Low Salinity Oil Recovery—Log-Inject-Log"; *SPE International*; Apr. 17, 2004; pp. 1-7; XP002336390 (Abstract).

(Continued)

*Primary Examiner*—Zakiya W. Bates
(74) *Attorney, Agent, or Firm*—Nixon & Vanderhye

(57) ABSTRACT

A method of recovering hydrocarbons from a porous subterranean hydrocarbon-bearing formation comprising the steps of: a) feeding to at least on reverse osmosis unit of a desalination assembly a high salinity water feed stream having a total dissolved solids content (total salinity) of at least 10,000 ppm; b) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure; c) injecting the low salinity water product stream into the hydrocarbon-bearing formation from an injection well; d) displacing the hydrocarbons with the low salinity water product stream toward an associated production well; and e) recovering hydrocarbons from the formation via the production well.

27 Claims, 2 Drawing Sheets

U.S. PATENT DOCUMENTS

| | | | |
|---|---|---|---|
| 4,156,645 A | 5/1979 | Bray | |
| 4,169,789 A | 10/1979 | Lerat | |
| 4,723,603 A | 2/1988 | Plummer | |
| 5,366,635 A | 11/1994 | Watkins | |
| 5,914,041 A | 6/1999 | Chancellor | |
| 6,177,011 B1 | 1/2001 | Hachisuka et al. | |
| 6,217,773 B1 | 4/2001 | Graham | |
| 6,348,148 B1 | 2/2002 | Bosley | |
| 6,413,425 B1 | 7/2002 | Hachisuka et al. | |
| 2007/0084778 A1* | 4/2007 | St.Germain et al. | 210/321.6 |

FOREIGN PATENT DOCUMENTS

| | | |
|---|---|---|
| EP | 0 968 755 A3 | 1/2000 |
| GB | 1 520 877 | 8/1978 |
| WO | WO 02/12675 A1 | 2/2002 |
| WO | WO 03/102346 A2 | 12/2003 |
| WO | WO 03/102346 A3 | 12/2003 |

OTHER PUBLICATIONS

Guo-Qing, T., et al; "Influence of brine composition and fines migration on crude oil/brine/rock interactions and oil recovery"; *Journal of Petroleum Science and Engineering*; vol. 24, Dec. 1999; pp. 99-111; XP002336391 (Abstract).

Pacenti, P., et al; "Submarine seawater reverse osmosis desalination system"; *Desalination* 126; pp. 213-128 (1999).

* cited by examiner

DESALINATION METHOD

This application is the U.S. National Phase of International Application PCT/GB2005/001939, filed 19 May 2005, which designated the U.S. PCT/GB2005/001939 claims the benefit of provisional Application No. 60/575,100 filed 28 May 2004. The entire content of these applications are incorporated herein by reference.

The present invention relates to a method of recovering hydrocarbons from a porous subterranean hydrocarbon-bearing formation by injecting a low salinity water into the formation wherein the low salinity water is produced using an underwater or downhole reverse osmosis desalination assembly that relies on hydrostatic head pressure to provide at least a major component of the pressure required to overcome the osmotic pressure.

BACKGROUND OF THE INVENTION

It has long been known that only a portion of the oil can be recovered from a permeable oil-bearing subterranean formation as a result of the natural pressure of the reservoir. So-called secondary recovery techniques are used to force the oil out of the reservoir. The simplest method of forcing the oil out of the reservoir rock is by direct replacement with another fluid. Water-flooding is one of the most successful and extensively used secondary recovery methods. Water is injected, under pressure, into reservoir rocks via injection wells, driving the oil through the rock toward the production wells.

It has been reported that the salinity of an injection water can have a major impact on the recovery of hydrocarbons during waterfloods, with increased recovery resulting from the use of diluted brines (see, for example, "Labs Spin Out Oilfield Technologies", American Oil & Gas Reporter, Vol 41, No. 7, July 1988, 105-108; "Effect of brine composition on recovery of Moutray crude oil by waterflooding", Journal of Petroleum Science and Engineering 14 (1996), 159-168; and "Prospects of improved oil recovery related to wettability and brine composition", Journal of Petroleum Science and Engineering 20 (1998) 267-276.

It is also known that the injection water used in a waterflood should be compatible with the formation water. Thus, underground formation waters can contain resident ions such as barium (e.g. at a level of up to 3000 ppm, for example 50-500 ppm) and usually also calcium (e.g. at a level of up to 30,000 ppm, for example 1000-5000 ppm) both in the form of soluble chlorides, but also in the presence of sulphate ions, so the water is saturated with barium sulphate, and usually also calcium sulphate. This formation water can meet seawater water, which can contain precipitate precursor ions such as soluble carbonate (e.g. at 100-5000 ppm) and sulphate (e.g. at 1000-3500 ppm). Mixing the two waters produces an aqueous supersaturated solution of barium sulphate and/or barium carbonate, and/or calcium sulphate and/or calcium carbonate, from which scale comprising these compounds deposits on surfaces. The meeting of the two waters can be in the formation, when seawater containing precipitate precursor ions is injected into the formation through an injection well at a distance from a production well to enhance oil recovery (i.e. a water flood treatment). The scaling may occur in the production well or downstream thereof e.g. in flow lines, or gas/liquid separators (for separating oil/water from gas) or in transportation pipelines leaving the gas/liquid separators. Carbonate scale may particularly form in the gas/liquid separator or downstream thereof, due to reduction in gas pressure causing soluble calcium bicarbonate to form insoluble calcium carbonate.

U.S. Pat. No. 4,723,603 relates to a process for reducing or preventing plugging in fluid passageways of hydrocarbon-bearing formations and in production wells which is caused by the accumulation of insoluble salt precipitates therein. This objective is achieved by removing most or all of the precursor ions of the insoluble salt precipitates from an injection water at the surface before the water is injected into the formation. Thus, insufficient precursor ions are available to react with ions already present in the formation to form significant amounts of the insoluble salt precipitates. The precursor ions of the insoluble salt precipitates are removed by means of a reverse osmosis membrane.

Pacenti et al describe a submarine seawater reverse osmosis desalination system in "Desalination" 126 (1999) 213-218. It is stated that conventional reverse osmosis (RO) systems have the disadvantage that they have to pressurize large amounts of water in the feed. The main operative differences of the submarine system concerns the fact that a high-pressure pump is required for pumping the desalinated water produced at great depth up to the sea surface while only a low-head circulation pump is needed for feeding seawater to the RO modules and for discharging the produced brine away from them. It is said that a prototype desalination unit will be immersed at a depth of approximately 600 m below sea level. The RO process will then be driven by seawater hydrostatic head pressure, and the produced desalinated water will be pumped through a tube from the submarine desalination unit to the sea surface via a specially designed pumping device. The technology is said to be particularly suitable for islands and remote coastal areas. However, there is no suggestion that this technology may be used for enhancing hydrocarbon production from a hydrocarbon bearing formation; and/or to provide desalinated injection water to prevent deposits of insoluble mineral salts in a hydrocarbon bearing formation and in an associated production well. Submerged desalination plants for producing potable water are also described in European Patent Application Number 0 968 755 and U.S. Pat. No. 5,366,635.

US Patent Application Publication Number US 2003/0230535 describes a method for desalinating saline aquifer water, the method comprising the steps of: providing a well extending from the surface into a saline aquifer, the well comprising a downhole membrane effective to desalinate or purify the saline aquifer water; allowing saline aquifer water to flow into the well from the saline aquifer; separating the saline aquifer water into a primary desalinated water stream and a secondary concentrated brine reject stream; and producing the primary desalinated water stream to the surface.

This method relies on the aquifer water flowing from the subsurface aquifer layer into a well, either by a natural pressure gradient between the aquifer and the well, or supported by a downhole pump. Thus, the method does not rely on hydrostatic head pressure to provide at least part of the pressure to overcome the osmotic pressure over the downhole membrane. Also, there is no suggestion that the primary desalinated water stream may be injected into a subterranean hydrocarbon bearing formation.

UK Patent Application GB 2 068 774 relates to an apparatus for desalinating seawater or brackish water by reverse osmosis where the osmosis cell or cells are located at a level sufficiently below the saline water supply and the brine discharge point so that the hydrostatic pressure resulting from the head provides the major component of the pressure at the saline side of the osmosis cell or cells needed to bring about reverse osmosis. There is no suggestion that the treated water may be injection into a hydrocarbon bearing formation to bring about enhanced hydrocarbon recovery.

Similarly, U.S. Pat. No. 4,125,463 describes a well system for desalination of salt water by reverse osmosis which takes advantage of the hydrostatic head of salt water therein for providing the differential pressure necessary for osmotic separation. Thus, a permeator assembly which includes one or more units having osmotic membranes therein is placed in a well at a depth such that the static head of salt water is great enough to create the necessary differential pressure for effecting the necessary osmotic separation. The concentrated salt water left over from the osmotic separation is allowed to exit the well. Again, there is no suggestion of injecting the salt-free water into a subsurface zone. Instead, the salt-free water is pumped to the surface of the well.

SUMMARY OF THE INVENTION

It has now been found that a low salinity water produced by feeding a high salinity water to a reverse osmosis desalination assembly that relies on hydrostatic head to provide at least a major component of the pressure required to overcome the osmotic pressure, may be injected into a porous subterranean hydrocarbon-bearing formation for recovering hydrocarbons therefrom.

Accordingly, the present invention relates to a method of recovering hydrocarbons from a porous subterranean hydrocarbon-bearing formation comprising the steps of:
a) feeding to at least one reverse osmosis unit of a desalination assembly a high salinity water feed stream having a total dissolved solids content (total salinity) of at least 10,000 ppm;
b) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure;
c) injecting the low salinity water product stream into the hydrocarbon-bearing formation from an injection well;
d) displacing the hydrocarbons with the low salinity water product stream toward an associated production well; and
e) recovering hydrocarbons from the formation via the production well.

Suitably, a hydrostatic head pressure may be exerted by the high salinity water on the feed side of the membrane of the reverse osmosis unit by submerging the reverse osmosis assembly in a body of water or by placing the reverse osmosis assembly downhole in a water injection well.

An advantage of submerging the reverse osmosis desalination assembly in a body of water or of placing the reverse osmosis desalination assembly downhole in a water injection well is that the high salinity water feed to the reverse osmosis unit(s) will be at a higher pressure (owing to the hydrostatic head of the column of high salinity water) than a high salinity water feed to a surface located reverse osmosis desalination plant, for example, a plant located on a platform. Accordingly, the hydrostatic head pressure of the high salinity water feed stream to the reverse osmosis desalination assembly may be used to offset pumping energy requirements and hence power demands of the platform. A disadvantage of surface located reverse osmosis desalination plants is that they have a large footprint and when installed on a platform as a retrofit, often require the addition of platform structure. Thus, a further advantage of submerging the reverse osmosis desalination assembly in a body of water or of locating the assembly downhole in an injection well is that this reduces the space and weight demands of the platform.

Preferably, the process of the present invention results in an increase in hydrocarbon recovery from the hydrocarbon-bearing formation of at least 5%, for example in the range 5 to 20% when compared with a waterflood treatment using the untreated high salinity water.

Preferably, the high salinity water feed stream has a total salinity of at least 20,000 ppm, more preferably, at least 30,000 ppm, most preferably, at least 35,000 ppm. Preferably, the high salinity water feed stream is seawater or estuarine water. A typical composition of the high salinity water feed stream is given below:

| Component | Concentration (ppm) |
| --- | --- |
| Chloride | 18,980 |
| Bromide | 65 |
| Sulfate | 2,649 |
| Bicarbonate | 140 |
| Fluoride | 1 |
| Boric acid | 26 |
| Magnesium | 1,272 |
| Calcium | 400 |
| Strontium | 13 |
| Potassium | 380 |
| Sodium | 10,556 |
| Total | 34,482 |

Where the high salinity water feed stream is seawater, the total dissolved solids content is typically at least 30,000 ppm, preferably, about 34,500 ppm.

Preferably, the low salinity water product stream has a total dissolved solids content of less than 4,000 ppm, more preferably, less than 3,000 ppm, for example, less than 2,000 ppm. In particular, it is preferred that the low salinity water product stream has a total dissolved solids content in the range 500 to 5,000 ppm, for example 500 to 3,000 ppm. Preferred compositions of the low salinity water product stream are given below:

| Component | Concentration (ppm) |
| --- | --- |
| Chloride | 192.6-1733 |
| Bromide | <0.1 |
| Sulfate | 5.7-51 |
| Bicarbonate | 2.1-19 |
| Fluoride | <0.1 |
| Boric acid | <0.1 |
| Magnesium | 3-27 |
| Calcium | 0.9-8 |
| Strontium | <0.1 |
| Potassium | 5.4-49 |
| Sodium | 118.5-1066 |
| Total | less than 3,000 |

The hydrostatic head pressure exerted by the high salinity water feed stream on the feed side of the membrane of the reverse osmosis unit should provide at least a major component of the pressure required to overcome the osmotic pressure (often referred to as "trans-membrane pressure") to bring about reverse osmosis. Typically, the high salinity water feed stream is fed to the reverse osmosis unit(s) at a pressure in the range 60 to 80 bar absolute, preferably, 65 to 75 bar absolute, for example, about 70 bar absolute. Suitably, the hydrostatic head pressure exerted by the high salinity water feed stream on the feed side of the membrane of the reverse osmosis unit provides at least 50% of the pressure required to overcome the osmotic pressure. Preferably, the hydrostatic head pressure exerted by the high salinity water feed stream on the feed side of the membrane provides at least 75%, more preferably at least 90%, preferably all of the pressure required to overcome the osmotic pressure. If necessary, the pressure exerted by the high salinity water feed stream may be increased to above the osmotic pressure, for example, using a low pressure pump. The high salinity water feed stream should be fed to the membrane at a pressure below the upper operating pressure of the reverse osmosis unit(s) so as to avoid rupturing the membrane.

The reverse osmosis membrane of the reverse osmosis unit(s) may be any of those known in the art. Reverse osmosis membranes can be divided into two categories (1) asymmetric membranes prepared from a single polymeric material and (2) thin-film composite membranes prepared from a first and a second polymeric material. Asymmetric membranes have a dense polymeric discriminating layer supported on a porous support formed from the same polymeric material. Examples include asymmetric cellulose acetate membranes. Thin-film composite membranes comprise a permselective discriminating layer formed from a first polymeric material anchored onto a porous support material formed from a second polymeric material. Generally the permselective discriminating layer is comprised of a cross-linked polymeric material, for example, a cross-linked aromatic polyamide. Suitably, the porous support material is comprised of a polysulfone. Polyamide thin-film composite membranes are more commonly used in reverse osmosis desalination plants since they typically have higher water fluxes, salt and organic rejections and can withstand higher temperatures and larger pH variations than asymmetric cellulose acetate membranes. The polyamide thin-film composite membranes are also less susceptible to biological attack and compaction. The reverse osmosis membrane should at least be capable of preventing significant amounts of dissolved solids from entering the treated low salinity water product stream while allowing the water solvent to pass across it. Preferably, the membrane of the reverse osmosis unit is a spiral wound membrane located within a housing.

The reverse osmosis desalination assembly is preferably operated in a continuous manner by continuously feeding the high salinity water feed stream into the reverse osmosis unit(s), and continuously discharging a waste brine stream and a low salinity water product stream from the reverse osmosis unit(s).

The low salinity water output of the reverse osmosis unit(s) of the assembly should satisfy the injection water requirement of the hydrocarbon bearing formation and is generally within a range of about 8.5 to 85 $l/m^2$-hr. Suitably, the ratio of the low salinity water product stream to waste brine stream discharged from the reverse osmosis unit(s) ranges from about 0.2:1 to about 4:1 and preferably is about 3:1.

The high salinity water feed stream may be introduced to a plurality of reverse osmosis units arranged in series, preferably, 2 to 3 reverse osmosis units arranged in series, wherein the feed stream to the second and subsequent units in the series is the retentate from the preceding unit in the series and the low salinity water product stream is the combined permeate streams from the reverse osmosis units in the series (hereinafter "multi-stage desalination assembly"). Thus, the operating pressure of the desalination assembly must be greater than the osmotic pressure for the final unit in the series. The waste brine stream is the retentate from the final unit in the series.

An advantage of the method of the present invention for recovering hydrocarbons from a porous hydrocarbon-bearing subterranean formation is that there is no requirement to reduce the total dissolved solids concentration of the injection water to the low levels required for high quality waters such as potable water. Where the low salinity water product stream is obtained from a multi-stage desalination assembly, the flux through the membranes of the reverse osmosis units may be higher than for a multistage desalination assembly that produces high quality water. Preferably, the flux through each of the membranes of the multi-stage desalination assembly is in the range 100-400 $l/m^2/h$ (where "flux" is defined as the volume of permeate passing through 1 $m^2$ of membrane per hour). Preferably, the combined flow rate of permeate (the low salinity water product stream) exiting the reverse osmosis units in the series is up to 75% of the flow rate of the high salinity water feed stream that is fed to the first reverse osmosis unit of the series. This may be compared with a desalination assembly for obtaining high quality water where the combined permeate stream generally comprises no more than about 50% of the flow rate of the high salinity water feed stream to the first reverse osmosis unit of the series.

The high salinity water feed stream may also be introduced into a single reverse osmosis unit (hereinafter "single stage desalination assembly") wherein the flux of permeate through the membrane of the unit is selected so as to achieve the desired total salinity for the low salinity water product stream. Preferably, a plurality of single reverse osmosis units are arranged in parallel. Where the low salinity water product stream is obtained in a single stage desalination assembly, the flux of permeate through the membrane of the reverse osmosis unit may be higher than for a single stage desalination assembly that produces high quality water, for example, potable water. Preferably, the flux of permeate passing through the membrane of the reverse osmosis unit is in the range 100-400 $l/m^2/h$. Typically, the flow rate of the permeate stream (the low salinity water product stream) is up to 75% of the flow rate of the high salinity water feed stream.

As discussed above, the desalination assembly may be submerged at a pre-determined depth in a body of water. Thus, in a first preferred aspect of the present invention there is provided a method of recovering hydrocarbons from a porous subterranean hydrocarbon-bearing formation comprising the steps of:

a) submerging a reverse osmosis desalination assembly comprising at least one reverse osmosis unit at a pre-determined depth in a body of water having a total dissolved solids content (total salinity) of at least 10,000 ppm;

b) feeding to at least one reverse osmosis unit of the desalination assembly a high salinity water feed stream taken from a location in the body of water at or near the pre-determined submerged depth;

c) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure;

d) injecting the low salinity water product stream into the hydrocarbon-bearing formation via an injection well;

e) displacing the hydrocarbons with the low salinity water product stream towards an associated production well; and f) recovering hydrocarbons from the formation via the production well.

If necessary, the hydrostatic head pressure of the high salinity water feed stream to the submerged reverse osmosis assembly may be reduced to below the upper operating pressure of the reverse osmosis unit(s). Alternatively, a sufficient back-pressure may be applied on the filtrate side of the membrane to prevent the membrane from collapsing or rupturing.

Where the reverse osmosis unit is submerged in a body of water, it is preferred that the body of water is a sea or an estuary. Suitably, the hydrostatic head of the high salinity water feed stream that is fed to the reverse osmosis unit(s) provides a major portion of the pressure required to overcome the osmotic pressure for the feed conditions and the membrane type employed in the reverse osmosis unit thereby allowing the high salinity water feed stream to be circulated through the reverse osmosis unit(s) via a low pressure circulation pump. Generally, the process of the present invention is operated using a high salinity water feed stream having a hydrostatic head pressure in the range of 25 to 70 bar absolute corresponding to a submerged depth of 250 to 700 metres. In contrast, where a desalination plant is located at the surface, the high salinity water feed stream will require a high pressure pump to raise the pressure of the feed stream to above the osmotic pressure for the feed conditions and the membrane type.

A further advantage associated with taking the high salinity water feed stream at a submerged depth of 250 to 700 metres is that the water has a significantly lower oxygen content than water taken from at or near the surface thereby reducing or even eliminating the need for deaerating the low salinity water product stream.

Typically, the low salinity water product stream (permeate) from the reverse osmosis assembly is at a pressure of about 1 bar absolute, typically 1.2 bar absolute. Thus, there is a pressure differential across the membrane of the reverse osmosis unit. Typically, the waste brine stream (retentate) is at a pressure, $P_3 = P_1 - P_2$, (wherein $P_1$ is the pressure of the high salinity water feed stream to membrane of the reverse osmosis unit(s) and $P_2$ is the pressure of the low salinity water product stream). Where the assembly is submerged in a body of water, it is preferred that the energy associated with the pressurized waste brine stream may be recovered, for example, using a device such as a Pelton Wheel, a Dual work energy exchanger, or a pressure exchanger that is coupled to the rotor of the low pressure pump(s) of the desalination assembly.

Where the assembly is submerged in a body of water, the desalination step of the process of the present invention is operated at the ambient temperature of the high salinity water feed stream. Generally, the ambient temperature of the high salinity water feed stream is in the range 3 to 15° C., preferably 4 to 10° C.

The submerged reverse osmosis desalination assembly preferably comprises a high salinity water feed pump, at least one reverse osmosis unit and a collection tank for the low salinity water product.

Preferably, the submerged reverse osmosis assembly is provided with a cleaning system for removing fouling deposits from the surface of the membrane of the reverse osmosis unit(s). Thus, the reverse osmosis membrane may be backflushed with a portion of the low salinity water product stream (permeate). For example, a portion of the permeate may be passed to a tank of the cleaning system. Water from the tank is then periodically backflushed through the reverse osmosis membrane before being recycled to the tank. A fine filter located in the cleaning system circuit removes fouling materials from the cleaning water. The water in the cleaning system tank may be periodically emptied and replaced by fresh permeate. Alternatively, during operation of the cleaning system, a portion of the cleaning water may be continuously discharged to the environment and fresh permeate may be continuously added to the cleaning water. Preferably, the reverse osmosis membrane is backflushed with a dilute sodium hydroxide solution and optionally a dilute sodium bisulfite solution prior to being backflushed with the permeate.

Preferably, the reverse osmosis desalination assembly is provided with ballast thereby allowing the depth at which the assembly is submerged to be adjusted. The reverse osmosis desalination assembly may also be provided with a gas supply, preferably an air supply, for purging water from the assembly thereby allowing the assembly to be recovered to the surface for servicing and/or repair. For example, the assembly may be provided with a gas supply line that runs from the surface and/or the assembly may further comprise a pressurized gas tank that may be actuated from the surface to purge water from the assembly. Suitably, the submerged reverse osmosis desalination assembly is provided with a submarine electric cable, preferably, an armored submarine electric cable for transmitting electricity to power the assembly. Suitably, the assembly is also provided with fibre optic cables for data and video transmission. The components of the reverse osmosis desalination assembly are located within a housing capable of withstanding the external hydrostatic pressure at the submerged depth. The housing also allows the reverse osmosis assembly to be operated with a reduced pressure on the permeate side of the membrane thereby generating the required pressure differential to drive a portion of the high salinity water feed stream across the membrane of the reverse osmosis unit.

Generally, the reverse osmosis unit(s) of the submerged underwater desalination assembly is adapted to work under the hydrostatic head pressure of the high salinity water feed stream. However, where the hydrostatic head pressure of the high salinity water feed stream is above the upper design pressure for the reverse osmosis unit(s), a sufficient back-pressure may be applied on the filtrate (permeate) side of the membrane to prevent the membrane from collapsing. Alternatively, the pressure of the high salinity water feed stream may be reduced to below the upper design pressure of the reverse osmosis unit(s) by partially evacuating the housing of the desalination assembly. Accordingly, it is envisaged that the interior of the housing may be in communication with a vacuum pump at the surface, for example, via a length of tubing. Where the hydrostatic head pressure of the high salinity water feed stream is below the osmotic pressure, for example, at a pressure of 40 bar absolute, it will be necessary to boost the pressure of the high salinity water feed stream to above the osmotic pressure, for example, using a seawater circulation pump. However, the duty on the seawater circulation pump will be less than if the reverse osmosis desalination plant was located at the surface. The person skilled in the art would understand that, where it is necessary to boost the hydrostatic head to a pressure above the osmotic pressure, the pressure within the housing of the reverse osmosis desalination assembly will be greater than the hydrostatic head pressure at the submerged depth. The housing must therefore be capable of withstanding the increased pressure within the housing.

Preferably, the submerged reverse osmosis desalination assembly is arranged in the body of water at a depth of up to 700 metres (corresponding to a hydrostatic head pressure of up to 70 bar absolute). Preferably, the desalination assembly is arranged at least 20 metres, preferably at least 30 metres above the seafloor, for example, either floating in the body of water or supported on a subsea structure. Suitably, the high salinity water feed to the desalination assembly is taken well above the sea floor to mitigate the risk of sediments entering the reverse osmosis module. Suitably, the high salinity water feed is taken below the photosynthetic layer of the body of water (for example, at below a depth of 30 metres) so as to minimize the amount of biomaterial in the high salinity water feed stream to the reverse osmosis unit(s). Advantageously, the high salinity water feed stream to the desalination assembly is taken at a depth where the hydrostatic head pressure corresponds to the operational pressure of the reverse osmosis membrane of the reverse osmosis unit(s). Typically, the high salinity water feed is taken at a location at or immediately above the reverse osmosis unit(s) of the desalination assembly. Suitably, a filter is provided at the inlet for the high salinity water feed stream to prevent particulate material from entering the assembly thereby protecting the membrane(s) of the reverse osmosis unit(s) from fouling. Preferably, the filter comprises at least one coarse and at least one fine filter. Suitably, the coarse filter is a strainer (for example, a metal mesh or perforated plate) or a bag filter formed from a woven metal mesh material. Preferably, the fine filter comprises a plurality of hollow fibre membranes arranged in a bundle within a housing (hereinafter "fine filtration unit"). Preferably, the hollow fibre membranes have a silt density index (sdi) of less than 5 (as determined using ASTM test D4189_95(2002) which measures water filtration times through a 0.45 µm filter). Preferably, the hollow fibre membranes reject particles having a mean diameter of greater than 0.01 µm. Suitable hollow fibre membranes are well known to the person skilled in the art. Preferably, a plurality of fine filtration units are arranged in parallel, for example, 3 to 6 units. Preferably, the submerged reverse osmosis desalination assembly is provided with a cleaning system for removing fouling material from the retentate side of the membranes of the fine filtration units, for example, the membranes may be back-flushed with a portion of the low salinity water product stream or the membranes may be sparged with a gas, preferably air. Suitably, the gas may be supplied from the surface via a gas supply line. Alternatively, the gas may be supplied from a pressurized gas tank of the desalination assembly. Typically, the pressurized gas tank is actuated from the surface. Preferably, the gas supply may also be used to purge water from the desalination assembly when it is desired to recover the assembly to the surface.

Preferably, a biocide and/or a scale inhibitor is dosed into the high salinity water feed stream to the submerged reverse osmosis assembly upstream of the fine filter(s). Examples of water soluble biocides include tetrakis(hydroxymethyl)phosphorium sulfate, zinc pyrithione, 1,2-benzisothiazolin-3-one, 2-(thiocyanomethylthio)benzothiazole, 2,2-dibromo-3-nitropropionamide, benzalkonium chloride, benzyl C10-16 alkyldimethyl ammonium chloride, didecyl-dimethyl-ammonium chloride, formaldehyde, glutaraldehyde, N-coco alkyl-1,3,-propylenediamine acetate, sodium hypochlorite, 2-methyl-4-isothiazolin-3-one, and 5-chloro-2-methyl-4-isothiazolin-3-one. The scale inhibitor is added to protect the desalination assembly, in particular, the reverse osmosis membranes from fouling by deposits of inorganic salt precipitates. Examples of suitable scale inhibitors include water-soluble organic molecules having at least 2 carboxylic and/or phosphonic acid and/or sulphonic acid groups e.g. 2-30 such groups. Preferred scale inhibitors are oligomers or polymers, or may be monomers with at least one hydroxyl group and/or amino nitrogen atom, especially in hydroxycarboxylic acids or hydroxy or aminophosphonic, or, sulphonic acids. Suitably, a concentrate of the biocide and/or a concentrate of the scale inhibitor is dosed into the high salinity water feed stream to the reverse osmosis assembly upstream of the fine filters. The concentrates may be either delivered from the surface via a flow line or the assembly may be provided with concentrate storage tanks that may be actuated from the surface to deliver the biocide or scale inhibitor into the high salinity feed stream, for example, via a remotely actuatable valve and pumping means. It is also envisaged that the submerged reverse osmosis desalination assembly may be provided with an electrochlorinator that converts sodium chloride in the untreated high salinity water feed stream into sodium hypochlorite. Suitably, a side stream is taken from the high salinity water feed stream and is passed through the electrochlorinator before being returned to the feed stream.

It is envisaged that the concentrate storage tank(s) may be removable from the submerged reverse osmosis desalination assembly, via a releasable connection means. This releasable connection means is preferably actuated from the surface. A replacement tank may be lowered from the surface and connected to the desalination assembly via the releasable connection means.

Suitably, the submerged reverse osmosis desalination assembly is provided with a high salinity water feed circulation pump to circulate the high salinity water feed stream through the reverse osmosis unit(s). Where the hydrostatic head pressure of the high salinity water feed stream is sufficient to drive a portion of the feed across the reverse osmosis membrane of the unit(s), the circulation pump may be a low pressure pump. Where it is necessary to boost the hydrostatic head pressure of the high salinity water feed stream in order to drive a portion of the water through the reverse osmosis unit(s), it may become necessary to employ a high pressure circulation pump. However, where the hydrostatic head pressure is marginally below the osmotic pressure for the feed conditions and membrane type, a low pressure circulation pump may be adequate.

The treated low salinity water (permeate) that passes through the membrane of the reverse osmosis unit(s) is preferably passed to a low salinity water collection vessel. From the collection vessel, the treated low salinity water product stream may be introduced into an injection well via a subsea injection system. Alternatively, the treated low salinity water may be returned to the surface, for example, via a riser, and may be subsequently introduced into an injection well via a surface injection system. An advantage of pumping treated low salinity water to the surface from a submerged desalination assembly compared with pumping untreated water to a surface desalination plant is that for the same output of treated low salinity water, the size of the pump and hence pumping costs may be markedly reduced. Generally, the pump will be located on a platform rather than being part of the submerged desalination assembly. Accordingly, the space and weight demands on the platform are also reduced.

The waste brine stream outlet of the submerged reverse osmosis desalination assembly is preferably located at a distance from the high salinity water feed stream inlet thereby mitigating the risk of waste brine being recycled to the desalination assembly. As discussed above, the inlet for the high salinity water feed stream to the desalination assembly is preferably located near the top of the desalination assembly or immediately above the desalination assembly (for example, within 5 metres of the top of the desalination assembly). Preferably, the outlet for the waste brine stream is located near the bottom of the desalination assembly or immediately below the desalination assembly (for example, within 5 metres of the bottom of the desalination assembly).

The submerged reverse osmosis desalination assembly may be tethered to the seabed via a submarine cable or may be tethered or otherwise secured to a floating structure such as a tension leg platform, a floating production storage off-loading unit (FPSO) or a riser. It is also envisaged that the submerged reverse osmosis desalination assembly may be arranged on an artificial buoyant seabed. Where the submerged reverse osmosis desalination assembly is tethered or otherwise secured to a riser, the treated injection water outlet of the assembly may be in fluid communication with the interior of the riser thereby providing a means for transporting the treated injection water to the surface. Suitably, the treated injection water outlet of the submerged desalination assembly is in fluid communication with a flow line that is tied in to the riser.

As discussed above, the reverse osmosis desalination assembly may also be located within an injection well ("downhole reverse osmosis assembly"). Thus, in a second preferred aspect of the present invention there is provided a method of recovering hydrocarbons from a porous subterranean hydrocarbon-bearing formation comprising the steps of:
  a) placing a reverse osmosis desalination assembly in an injection well that penetrates the hydrocarbon-bearing formation wherein the assembly is located either above or adjacent to the hydrocarbon-bearing formation;
  b) injecting into the injection well a high salinity water feed stream having a total salinity of at least 10,000 ppm;
  c) feeding the high salinity water feed stream to at least one reverse osmosis unit of the desalination assembly;
  d) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure;
  e) injecting the low salinity water product stream from the injection well into the hydrocarbon-bearing formation;
  f) displacing the hydrocarbons with the low salinity water product stream toward an associated production well; and
  g) recovering hydrocarbons from the hydrocarbon-bearing formation via the production well.

Thus, the high salinity water that is injected into the injection well is passed through the downhole reverse osmosis desalination assembly and the treated low salinity water product stream is subsequently injected into the hydrocarbon-bearing formation. Preferably, the injection well has a casing cemented therein in a conventional manner. An injection tubing is then placed within the casing leaving an annular space therebetween. Suitably, the reverse osmosis assembly is located within the injection tubing or is attached to the lower end thereof. Preferably, the downhole reverse osmosis desalination assembly comprises a plurality of stacked substantially tubular reverse osmosis units. Where the downhole desalination assembly is located within the injection tubing, the assembly is provided with an expandable sealing member that engages with and seals against the inner wall of the injection tubing thereby preventing the high salinity water from by-passing the assembly. An advantage of locating the assembly within the injection tubing is that the assembly is easily retrievable from and insertable into the injection tubing of the well, for example, using a conventional wireline hoisting system. Thus, the assembly may be retrieved for maintenance.

The depth of the well and the depth at which the reverse osmosis assembly is placed therein is such that the hydrostatic head pressure of the high salinity water feed stream provides at least a major portion of the pressure required for overcoming the osmotic pressure and effecting osmotic separation of the low salinity water product stream (permeate) and the concentrated waste brine stream (retentate). Preferably, a downhole pump, for example an electrical submersible pump (ESP) is arranged downstream of the reverse osmosis assembly for pumping the low salinity water product stream into the porous subterranean hydrocarbon-bearing formation. The ESP and the desalination assembly may be built together into a single unit. Preferably, the assembly and ESP are located in the lower portion of the injection tubing. Generally, the lower end of the injection tubing will be adjacent to or immediately above the porous hydrocarbon-bearing formation.

Suitably, the waste brine stream may be produced from the injection well, for example, through the annulus formed between the injection tubing and the casing. Suitably, a conduit extends from a brine outlet of the downhole reverse osmosis desalination assembly into the annulus, for example, the conduit may penetrate the injection tubing such that the waste brine stream is discharged into the annulus and is produced therefrom. Alternatively, the waste brine stream is injected into a porous subterranean formation (brine disposal zone) that is below the porous hydrocarbon-bearing formation and is hydraulically isolated therefrom (i.e. has no fluid connection to the porous hydrocarbon-bearing formation). Accordingly, a by-pass conduit may extend from the brine outlet of the reverse osmosis desalination assembly to the brine disposal zone. The waste brine stream (permeate) that exits the reverse osmosis assembly is at a relatively high pressure. It is envisaged that no further pumping may be required to inject the waste brine stream into the brine disposal zone or to produce the waste brine stream from the injection well. However, if necessary, a pump may boost the pressure of the waste brine stream. Where the waste brine stream is produced to the surface, the pump may be an ESP or a surface located pump. Where the waste brine stream is injected into a brine disposal zone, the pump is an ESP.

The high salinity water that is introduced into the injection well is filtered in a conventional manner to remove particulate matter. Suitably, biocides, scale inhibitors and corrosion inhibitors may be dosed into the high salinity water in a conventional manner. Suitable biocides and scale inhibitors are described above.

Various operating parameters such as the pressures and temperatures at different points downhole, the flow rate of the high salinity feed stream, the flow rate of the low salinity water product stream and the flow rate of the waste brine stream may be monitored using downhole monitoring devices, and the data are transmitted to surface via communication links such as an electric or fibre optic cable and/or wireless electromagnetic or acoustic telemetry systems.

The downhole reverse osmosis assembly is operated at the temperature prevailing in the injection well at the location of the assembly in the wellbore. The pressure of the high salinity injection water feed stream should be less than the upper operating pressure of the membrane of the reverse osmosis unit(s).

The process of the present invention is particularly advantageous where the high salinity water feed stream has a different ionic makeup to the formation water and where precipitation of insoluble mineral salts would otherwise occur in the formation, and/or in the production well and/or downstream thereof.

Thus, according to a further aspect of the present invention, there is provided a method of recovering hydrocarbons from a porous subterranean hydrocarbon-bearing formation comprising the steps of:

a) feeding to at least one reverse osmosis unit of a desalination assembly a high salinity water feed stream having a total dissolved solids content (total salinity) of at least 10,000 ppm and containing precipitate precursor ions in an amount sufficient to form insoluble mineral salt precipitates in the formation if the high salinity water feed stream contacted resident ions in the formation;

b) driving a portion of the high salinity water feed stream across a membrane in the reverse osmosis unit of the desalination assembly at a pressure above the osmotic pressure of the high salinity water feed stream while excluding at least a portion of the precipitate precursor ions from crossing said membrane wherein the hydrostatic head exerted by the high salinity water feed stream on the feed side of the membrane provides at least a major component of the pressure required to overcome the osmotic pressure thereby producing (i) a treated low salinity water product stream having a total dissolved solids contents of less than 5,000 ppm and having a precursor ion concentration less than the concentration of precursor ions in the untreated high salinity water feed stream such that the precursor ion concentration in the product stream is insufficient to form insoluble mineral salt precipitates in an amount to substantially plug the pores of the porous formation when the treated injection water product stream contacts the resident ions in the formation and (ii) a waste brine stream;

c) injecting the low salinity water product stream into the hydrocarbon-bearing formation from an injection well;

d) displacing the hydrocarbons with the low salinity water product stream toward an associated production well; and e) recovering hydrocarbons from the formation via the production well.

As discussed above, the reverse osmosis assembly may be submerged at a predetermined depth in a body of water or may be arranged downhole in an injection well.

Precipitate precursor ions are defined as ions which form insoluble mineral salt precipitates at the conditions of the formation or in the production well when they contact resident ions. Resident ions are defined as naturally or artificially occurring ions already present in the formation. The precipitate precursor ions must be a different ionic species and oppositely charged to the resident ionic species it contacts in the formation.

Specific ions which can be precursor ions of insoluble mineral salt precipitates include $SO_4^{2-}$, $CO_3^{2-}$, $HCO_3^-$, $HS^-$ and mixtures thereof.

Resident ions already present in the formation which have been observed to form insoluble salt precipitates upon contact with the precursor ions include $Ba^{2+}$, $Sr^{2+}$, $Mg^{2+}$, $Ca^{2+}$, $Fe^{2+}$, $Fe^{3+}$, $Al^{3+}$, $Pb^{2+}$, $Zn^{2+}$ and mixtures thereof.

The resident ions may be naturally occurring in the formation water or may be artificially occurring as a result of some prior treatment process. The resident ions need only be present in the formation at a sufficient concentration to form precipitates with the precursor ions at formation or production well conditions when the dispersion is injected into the formation.

The actual precursor ion concentration at which precipitation occurs for a given case is a function of many variables including the concentration of other ions in solution and the in situ conditions of, for example, temperature, pressure and pH. A person skilled in the art can in many cases predict precipitation from data collected from a formation and can therefore apply the present method before significant deposition of precipitates actually occurs. It is also envisaged that the method of the present invention may be applied as a remedial action after deposition of precipitates is observed in the production well or downstream thereof.

There is no fixed minimum threshold concentration of precursor ions in the injection water above which precipitation and plugging will occur in all cases. However, an untreated injection water (high salinity water feed stream) having a precursor ions concentration above 50 ppm, preferably above 100 ppm can often form precipitates of insoluble mineral salts when contracted with the appropriate resident ion in situ. Thus, the process of the present invention is generally applicable when the untreated injection water (high salinity injection water feed stream) has a precursor ion concentration above 50 ppm, preferably above 100 ppm and most preferably above 500 ppm.

The reverse osmosis membrane should at least be capable of preventing significant amounts of precipitate precursor ions from entering the treated injection water product stream. The membrane may also eliminate other ions from the water product i.e. is non-selective. However, the membrane is preferably one which selectively prevents the precipitate precursor ions from passing across it from the high salinity water feed into the treated injection water product while at the same time allowing the water solvent and harmless ions to pass across it. The selectivity of a membrane is a function of the particular properties of the membrane, including the pore size of the membrane or the electrical charge of the membrane. For example, a polyamide membrane is particularly effective for selectively preventing the precursor ion $SO_4^{2-}$ from passing across it. Suitable ion selective membranes for removing $SO_4^{2-}$ from an injection water include polyamide membranes obtainable from Osmonics Inc., Hydronautics, Dow and Torai. The reverse osmosis unit(s) is advantageously operated such that the percentage ion selectivity of the low salinity water product stream for precursor ions is less than about 10% and preferably less than about 3%. Percentage ion selectivity to the product is defined as the ion concentration in the product divided by the ion concentration in the feed expressed as a percentage.

The harmless ions that pass through a selective membrane into the treated injection water may even have a beneficial effect in the formation. For example, potential clay stabilizing ions, such as $K^+$, $Na^+$, $Cl^-$, $Br^-$ and $OH^-$, may be passed into the treated injection water product stream and subsequently injected into the formation to beneficially prevent clay swelling or particle migration.

BRIEF DESCRIPTION OF THE DRAWINGS

The invention will now be described in more detail with reference to the accompanying drawings, in which.

DETAILED DESCRIPTION OF PREFERRED EMBODIMENTS

Figure 1:
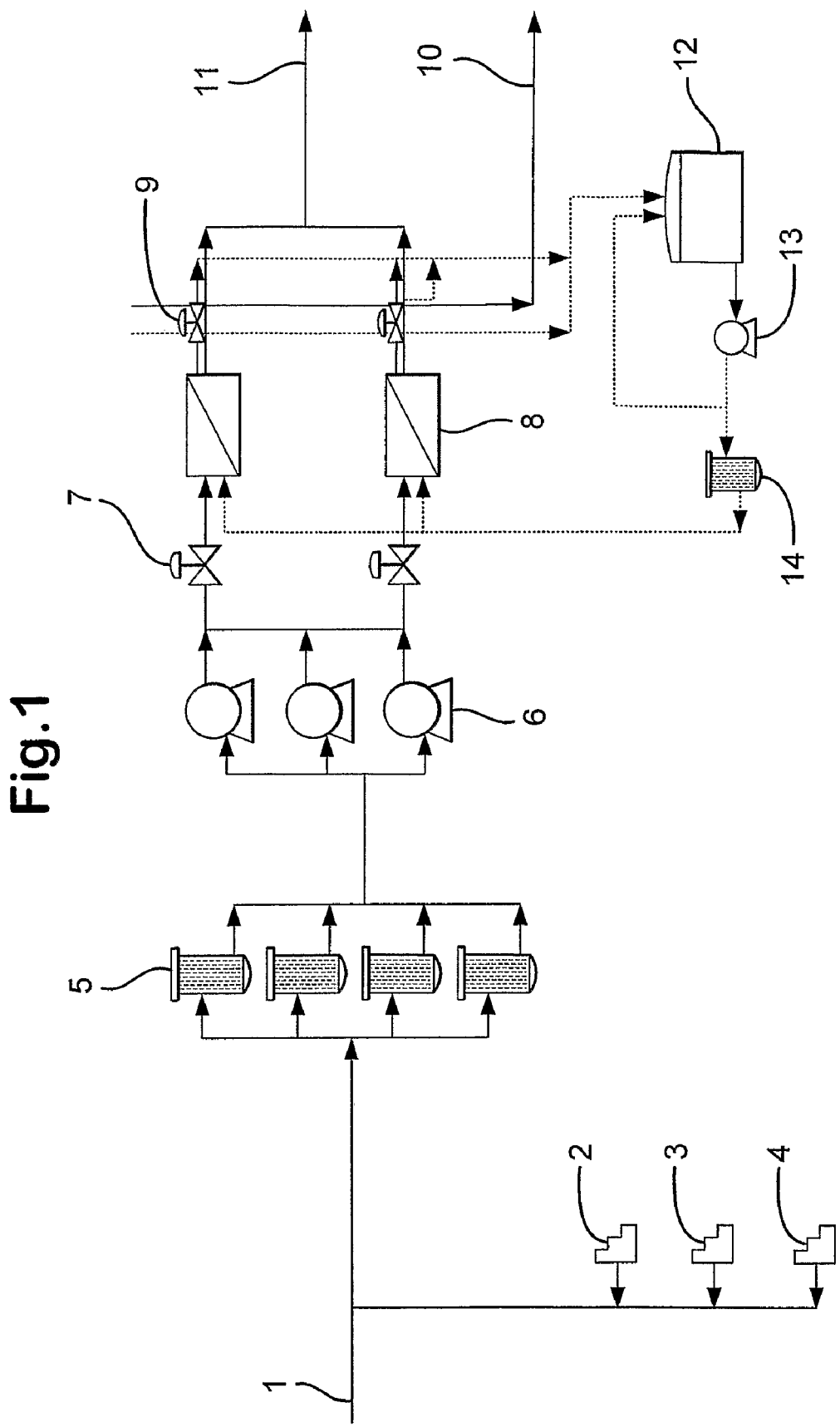
FIG. 1 is a schematic diagram showing desalination of a feed stream.

In the flow diagram of FIG. 1, a high salinity water feed stream 1 is passed through a coarse filter (not shown). A biocide concentrate stream 2, a sodium bisulfite concentrate stream 3 and a scale inhibitor concentrate stream 4 are continuously dosed into the high salinity water feed stream 1 upstream of a plurality of fine filters 5 that are arranged in parallel. The feed stream is then passed via at least one low pressure pump 6 and valves 7 to a plurality of reverse osmosis units 8 that are arranged in parallel. Flow control valves 9 are provided on the outlet for the waste brine stream 10 (retentate). The waste brine stream 10 is discharged to the environment after removing energy therefrom via a Pelton Wheel, a Dual work energy exchanger, or a pressure exchanger (not shown) that is coupled to the rotors of the low pressure pump(s) 6. The low salinity water product stream 11 (retentate) is passed to a storage tank (not shown) before being returned to the surface, for example, via a riser (not shown) or being sent via a flow line to a subsea injection system (not shown). At least a portion of the low salinity water product stream 11 is fed to a tank 12 of a cleaning system. Periodically, valves 7 and 9 are closed and the low pressure pump(s) 6 is switched off to allow backflushing of the membranes of the reverse osmosis units 8. Low salinity water from tank 12 of the cleaning system is then pumped to the permeate side of the membranes of the reverse osmosis units 8 via pump 13 before being recycled to the tank 12. A fine filter 14 positioned in the cleaning circuit removes any fouling material that is washed from the membranes of the reverse osmosis units 8.

Figure 2:
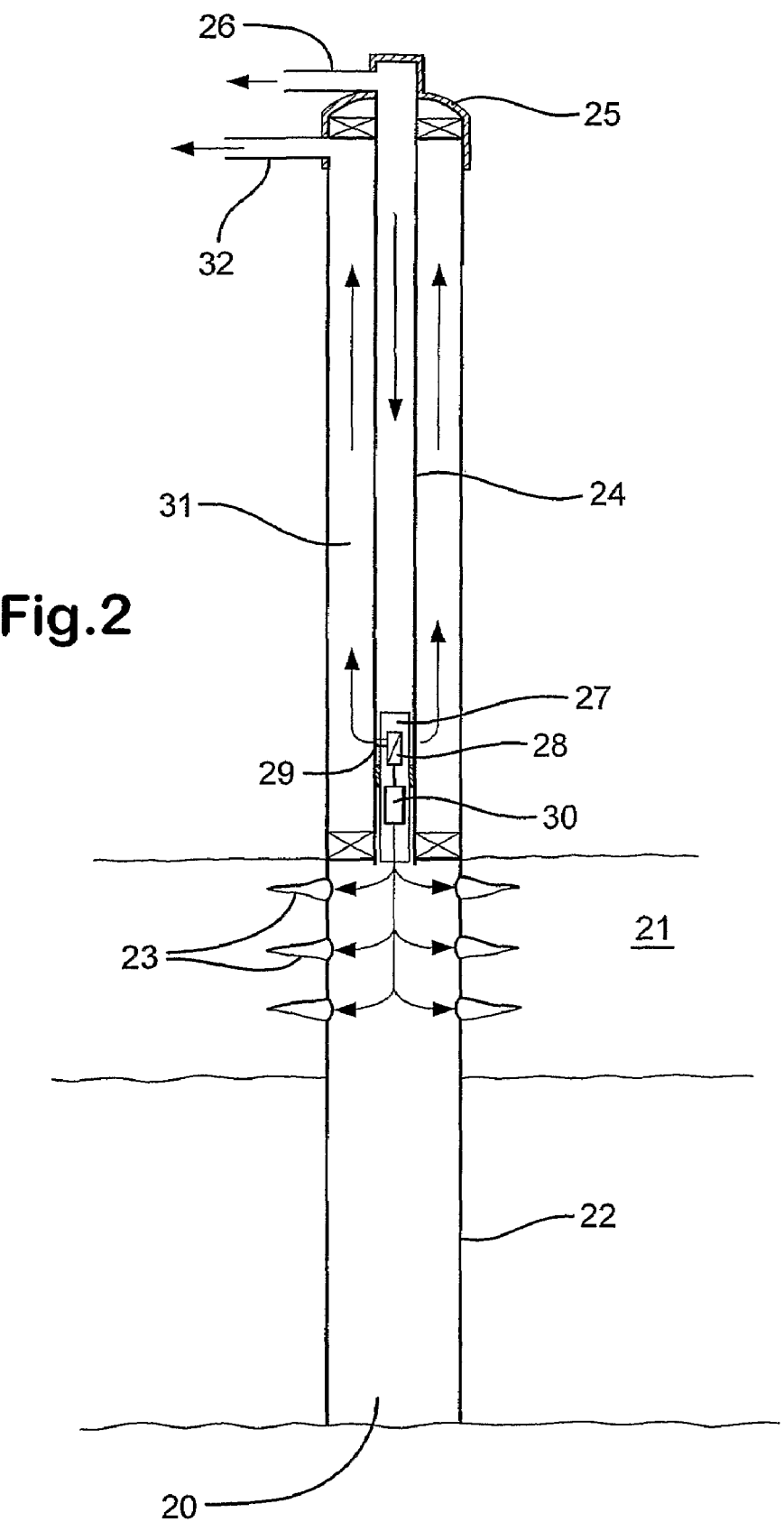
FIG. 2 is a schematic of an injection well arrangement for injecting a low salinity feed steam into a hydrocarbon bearing formation.

In FIG. 2, an injection well 20 penetrates a porous hydrocarbon bearing formation 21. A casing 22 extends below the hydrocarbon bearing formation 21. Perforations 23 are provided in the casing 22 adjacent the hydrocarbon-bearing formation 21. An injection tubing 24 extends from the wellhead 25 into the injection well 20 to a position immediately above the hydrocarbon bearing formation 21. A high salinity water feed stream is introduced into the injection well 20 via injection line 26. The high salinity water feed stream passes down the injection tubing 24 to a reverse osmosis assembly 27 and is fed to a membrane of a reverse osmosis unit 28 of the assembly 27. A low salinity water product stream (permeate) exits the reverse osmosis unit 28 and passes to a pump 30 of the assembly 27. The pump 30 provides pumping energy to inject the low salinity water product stream into the hydrocarbon-bearing formation 21. A waste brine stream (retentate) exits the reverse osmosis unit 28 via a conduit 29 that penetrates through the injection tubing 24 into the annulus 31 formed between the casing 22 and the injection tubing 24. The waste brine stream is produced to the surface through the annulus 31 and exits the wellhead 25 via line 32.

The invention claimed is:

1. A method of recovering hydrocarbons from a porous subterranean hydrocarbon-bearing formation by injecting a low salinity water into the formation from an injection well comprising the steps of:
    a) feeding a high salinity water feed stream having a total dissolved solids content (total salinity) of at least 10,000 ppm to at least one reverse osmosis unit of a desalination assembly that is either submerged in a body of water or is placed in the injection well;
    b) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure;
    c) injecting the low salinity water product stream into the hydrocarbon-bearing formation from the injection well with the proviso that where the desalination assembly is submerged in a body of water, the treated low salinity water product stream is passed to a low salinity water collection vessel before being introduced into the injection well via a subsea injection system;
    d) displacing the hydrocarbons with the low salinity water product stream toward an associated production well; and
    e) recovering hydrocarbons from the formation via the production well.

2. A method as claimed in claim 1 wherein the high salinity water feed stream has a total dissolved solids content (total salinity) of at least 10,000 ppm and contains precipitate precursor ions in an amount sufficient to form insoluble mineral salt precipitates in the porous hydrocarbon bearing formation if the high salinity water feed stream contacted resident ions in the hydrocarbon bearing formation and wherein at least a portion of the precipitate precursor ions are excluded from crossing the membrane of the reverse osmosis units thereby producing (i) a treated low salinity water product stream having a total dissolved solids contents of less than 5,000 ppm and having a precursor ion concentration less than the concentration of precursor ions in the untreated high salinity water feed stream such that the precursor ion concentration in the product stream is insufficient to form insoluble mineral salt precipitates in an amount to substantially plug the pores of the porous formation when the treated injection water product stream contacts the resident ions in the formation and (ii) a waste brine stream.

3. A method as claimed in claim 2 wherein the precipitate precursor ions are selected from the group consisting of $SO_4^{2-}$, $CO_3^{2-}$, $HCO_3^-$, and $HS^-$.

4. A method as claimed in claim 2 wherein the resident ions already present in the hydrocarbon bearing formation are selected from the group consisting of $Ba^{2+}$, $Sr^{2+}$, $Mg^{2+}$, $Ca^{2+}$, $Fe^{2+}$, $Fe^{3+}$, $Al^{3+}$, $Pb^{2+}$, and $Zn^{2+}$.

5. A method as claimed in claim 2 wherein the high salinity water feed stream has a precursor ion concentration above 50 ppm and the percentage ion selectivity of the low salinity water product stream for precursor ions is less than about 10%.

6. A method as claimed in claim 5 wherein the high salinity water feed stream has a precursor ion concentration above 50 ppm and the percentage ion selectivity of the low salinity water product stream for precursor ions is less than about 3%.

7. A method as claimed in claim 1 wherein the hydrocarbon recovery from the hydrocarbon-bearing formation is increased by 5 to 20% compared with using the untreated high salinity water.

8. A method as claimed in claim 1 wherein the high salinity water feed stream has a total salinity of at least 20,000 ppm.

9. A method as claimed in claim 1 wherein the low salinity water product stream has a total dissolved solids content in the range 500 to 3,000 ppm.

10. A method as claimed in claim 1 wherein a biocide and/or a scale inhibitor is dosed into the high salinity feed stream.

11. A method as claimed in claim 1 wherein the high salinity water feed stream is fed to the reverse osmosis unit(s) at a pressure in the range 60 to 80 bar absolute and the hydrostatic head exerted by the high salinity water feed stream on the teed side of the membrane of the reverse osmosis unit(s) provides at least 50%, preferably, at least 75%, of the pressure required to overcome the osmotic pressure.

12. A method as claimed in claim 1 wherein the high salinity water feed stream is introduced into a plurality of reverse osmosis units arranged in series wherein the feed stream to the second and subsequent units in the series is the retentate from the preceding unit in the series and the low salinity water product stream is the combined permeate streams from the reverse osmosis units in the series and the waste brine system is the retenate from the final unit in the series.

13. A method as claimed in claim 12 wherein the flux through the membrane of each of the reverse osmosis units of the series is in the range 100-400 $l/m^2/h$ and the combined flow rate of the low salinity water product stream exiting the reverse osmosis units of the series is up to 75% of the flow rate of the high salinity water feed stream that is fed to the first reverse osmosis unit of the series.

14. A method as claimed in claim 1 wherein the reverse osmosis desalination assembly is submerged in a body of water at a depth in the range 250 to 700 meters.

15. A method as claimed in claim 14 wherein the submerged reverse osmosis assembly comprises a coarse filtration unit and a fine filtration unit arranged sequentially upstream of the reverse osmosis unit.

16. A method as claimed in claim 14 wherein gas is supplied from the surface via a gas supply line to purge water from the submerged reverse osmosis desalination assembly when it is desired to recover the assembly to the surface.

17. A method as claimed in claim 14 wherein the submerged reverse osmosis desalination assembly is tethered to the seabed via a submarine cable or is secured to a floating structure or a riser.

18. A method as claimed in claim 1 wherein the reverse osmosis desalination assembly is arranged in an injection well at a location either above or adjacent to the hydrocarbon-bearing formation and the high salinity water feed stream is introduced into the injection well.

19. A method as claimed in claim 18 wherein the downhole reverse osmosis assembly is located within the injection tubing of an injection well or is attached to the lower end of the injection tubing.

20. A method as claimed in claim 18 wherein the waste brine stream from the downhole reverse osmosis assembly is produced from the well or is injected into a porous formation that is hydraulically isolated from the porous hydrocarbon formation.

21. An injection well for injecting desalinated water into a porous hydrocarbon bearing formation which injection well comprises (a) a downhole desalination assembly comprising at least one reverse osmosis unit for separating a high salinity water feed stream that is introduced into the injection well into a low salinity water product stream and a waste brine stream, and (b) a downhole pump for generating the pressure required for injecting the low salinity water product stream into the porous hydrocarbon subterranean formation.

22. An injection well as claimed in claim 21 wherein an injection tubing is arranged in the upper portion of the injection well in sealing engagement with the wellbore wall and the lower end of the injection tubing lies above the porous hydrocarbon bearing formation and wherein the downhole desalination assembly is arranged either within the injection tubing in sealing engagement with the inner wall of the injection tubing or is connected either directly or indirectly to the lower end of the injection tubing.

23. An injection well as claimed in claim 21 wherein a waste brine by-pass conduit extends from the waste brine outlet of the downhole desalination assembly to a waste brine disposal formation that is penetrated by the injection well.

24. An injection well as claimed in claim 21 wherein a waste brine conduit extends through the wall of the injection tubing into the annulus formed between the injection tubing and the wellbore wall and the injection well is provided with a downhole or a surface located pump for pumping the waste brine stream out of the injection well via the annulus.

25. An injection well as claimed in claim 21 wherein the wellbore is a cased wellbore and the casing is perforated adjacent the porous hydrocarbon formation and adjacent the optional waste brine disposal formation.

26. An injection well as claimed in claim 21 wherein a downhole electrical pump is provided downstream of the reverse osmosis unit(s) of the desalination assembly for pumping the low salinity water product stream into the hydrocarbon bearing formation.

27. An injection well as claimed in claim 21 wherein the reverse osmosis assembly comprises a plurality of stacked membrane units and the assembly is retrievable and insertable into the injection well.

* * * * *